US009840091B2

(12) United States Patent
Cloots et al.

(10) Patent No.: US 9,840,091 B2
(45) Date of Patent: Dec. 12, 2017

(54) MANUFACTURING OF DECORATIVE WORKPIECES BY INKJET

(71) Applicants: AGFA GRAPHICS NV, Mortsel (BE); Unilin BvbA, Wielsbeke (BE)

(72) Inventors: Tom Cloots, Mortsel (BE); Laurent Meersseman, Mortsel (BE); Joris Van Garsse, Mortsel (BE)

(73) Assignees: AGFA GRAPHICS NV, Mortsel (BE); UNILIN BVBA, Wielsbeke (BE)

( * ) Notice: Subject to any disclaimer, the term of this patent is extended or adjusted under 35 U.S.C. 154(b) by 0 days.

(21) Appl. No.: 15/116,535

(22) PCT Filed: Feb. 3, 2015

(86) PCT No.: PCT/EP2015/052165
§ 371 (c)(1),
(2) Date: Aug. 4, 2016

(87) PCT Pub. No.: WO2015/117944
PCT Pub. Date: Aug. 13, 2015

(65) Prior Publication Data
US 2016/0347085 A1 Dec. 1, 2016

(30) Foreign Application Priority Data
Feb. 7, 2014 (EP) .................................... 14154309

(51) Int. Cl.
*B41J 3/407* (2006.01)
*H04N 1/00* (2006.01)
(Continued)

(52) U.S. Cl.
CPC ............... *B41J 3/4073* (2013.01); *B41J 2/01* (2013.01); *B44C 5/04* (2013.01); *G06F 3/1219* (2013.01);
(Continued)

(58) Field of Classification Search
CPC ..... G06F 3/125; G06F 3/1251; H04N 1/3872; H04N 1/00
See application file for complete search history.

(56) References Cited

U.S. PATENT DOCUMENTS

| | | | |
|---|---|---|---|
| 2004/0109201 A1* | 6/2004 | Teraue | H04N 1/3872 358/1.18 |
| 2010/0046010 A1 | 2/2010 | Bauer | |
| 2015/0030817 A1 | 1/2015 | Wiegelmann et al. | |

FOREIGN PATENT DOCUMENTS

| | | | |
|---|---|---|---|
| DE | 10 2006 057 961 A1 | 6/2008 | |
| DE | 10 2008 033 274 A1 | 1/2010 | |

(Continued)

OTHER PUBLICATIONS

Nielsen et al., Fast Neighborhood Search for the Nesting Problem, Feb. 14, 2003, University of Copenhagen, 1Technical Report No. 03/02.*

(Continued)

*Primary Examiner* — Julian Huffman
(74) *Attorney, Agent, or Firm* — Keating and Bennett, LLP

(57) ABSTRACT

A method for manufacturing decorative workpieces includes the step of nesting a set of decorative patterns digitally printed on a decoration layer to reduce the waste of decoration layer. To perform a corresponding relief for the nested decorative patterns on a nested decorative workpiece, the relief provided by a digital relief apparatus is in a correct match with the nested decorative workpiece. If the printing zone of the digital printer has a failure zone, the nesting method prevents arranging of the decorative patterns in this failure zone.

19 Claims, 9 Drawing Sheets

(51) Int. Cl.
  *H04N 1/387* (2006.01)
  *B41J 2/01* (2006.01)
  *G06F 3/12* (2006.01)
  *B44C 5/04* (2006.01)

(52) U.S. Cl.
  CPC ............ *G06F 3/1251* (2013.01); *H04N 1/00* (2013.01); *H04N 1/3872* (2013.01)

(56) References Cited

FOREIGN PATENT DOCUMENTS

| DE | 10 2010 036 454 A1 | 1/2012 | | |
|----|----|----|----|----|
| EP | 2 431 190 A2 | 3/2012 | | |
| EP | 2 556 962 A1 | 2/2013 | | |
| EP | 2 695 746 A1 | 2/2014 | | |
| WO | WO2014024101 | * | 2/2014 | ................ B44F 9/02 |

OTHER PUBLICATIONS

Official Communication issued in International Patent Application No. PCT/EP2015/052165, dated Apr. 20, 2015.
Van Garsse et al., "Manufacturing of Decorative Workpieces by Inkjet", U.S. Appl. No. 15/116,537, filed Aug. 4, 2016.

* cited by examiner

US 9,840,091 B2

MANUFACTURING OF DECORATIVE WORKPIECES BY INKJET

CROSS-REFERENCE TO RELATED APPLICATIONS

This application is a 371 National Stage Application of PCT/EP2015/052165, filed Feb. 3, 2015. This application claims the benefit of European Application No. 14154309.0, filed Feb. 7, 2014, which is incorporated by reference herein in its entirety.

BACKGROUND OF THE INVENTION

1. Field of the Invention

The present invention relates to methods for manufacturing decorative workpieces such as decorative panels.

2. Description of the Related Art

Gravure, offset and flexography are being increasingly replaced for different applications by industrial inkjet printing systems, which have now proven their flexibility in use, such as variable data printing making short production runs and personalized products possible, and their enhanced reliability, allowing incorporation into production lines.

Inkjet technology, as digital printing technology has also caught the attention of manufacturers of decorative surfaces, such as laminate floor. In the current production process for manufacturing decorative panels as shown by FIG. 1, a paper manufacturer (11) supplies a paper roll (12) to a decor printer (13) who uses gravure printing (14) in order to deliver a decor paper roll (16) to a warehouse (17) of a floor laminate manufacturer (20). Some decor printers (13) are now investigating inkjet printing (15) instead of gravure printing. Rotogravure printing on the porous decor paper generally uses ink having a viscosity at 25° C. of 1 to 2 Pa·s, while the viscosity of inkjet inks is much lower, often about 1 to 15 mPa·s at 25° C. The floor laminate manufacturer (20) stores the decor paper rolls (16) having different decorative patterns in his warehouse (17). Depending on the market demand, the floor laminate manufacturer (20) then selects the decor rolls (16) with the desired decorative pattern in his warehouse (17). The selected decor rolls (16) are then impregnated (18) and cut to size (19) for manufacturing ready-to-use floor laminate (21). The warehouse (17) is necessary as a buffer for sudden large market demands of a specific floor laminate because there is a large time delay between ordering and delivering of new decorative paper rolls (16).

An approach to reduce the size of the warehouse and time delays is treated by EP 2431190 A (THEODOR HYMMEN), which discloses in FIG. 1 a method for producing a digitally printed sheet, web or plate-shaped workpiece (20) with wear-resistant surface including the steps of: A) providing a digital data set to a digital printing device (1); B) providing a printable workpiece (20) to the printing apparatus (1); C) digital printing at least an acrylate printing ink (22) on the printable workpiece (20) using the printing apparatus (1) and thereafter supplying a resin mixture (5, 21) to the digitally printed workpiece; and D) curing the resin mixture (5, 21) by means of a heated press (7). The time delay can be avoided by the floor laminate manufacturer incorporating the manufacturing of decorative paper rolls into its own production process.

Also aqueous inkjet inks have been used for manufacturing decorative laminates by single pass inkjet printing. For example, in the Palis roll-to-roll single pass printing systems (http://www.palis-digital.com/en/portfolio/sp-drucker.html) aqueous inkjet inks are printed on a paper substrate having a special ink acceptance layer.

An increase in waste of decorative workpieces has been observed on performing the digital printing of decorative patterns at the facilities of the laminate manufacturer. This increase of waste is observed not only in the more frequent short run productions, but especially when sizes of digital printed decorative patterns are different or when the shapes of digital printed decorative patterns are different. Therefore, there is a need to reduce the waste of decoration layer and workpieces.

DE102006057961 (BAUER JOERG) discloses a method of producing floor panels wherein an arrangement method is disclosed in FIG. 1 and described in [0027] but is silent about details in this arrangement method and the reasons behind this kind of arrangement.

EP2695746 (UNILIN BVBA), which became public available on 12 Feb. 2014, with a date of filing on 6 Aug. 2012, discloses a method wherein multiple rectangular-shaped decorative patterns are printed on a decoration layer but wherein the decorative patterns are arranged in predetermined areas based on the dimension of the predetermined areas. Therefore the dimensions of the decorative patterns are also fixed. But they are not a solution wherein multiple decorative patterns have to be arranged on a decoration layer and wherein the dimensions and shapes of the decorative patterns have a lot of variances.

DE102010036454 (FRITZ EGGER GMBH) discloses a similar method for arrangement of decorative patterns as in EP295746 (UNILIN BVBA) but also in here the decorative patterns are arranged in predetermined areas based on the dimension of the predetermined areas. Therefore the dimensions of the decorative patterns are also fixed. But they are not a solution wherein multiple decorative patterns have to be arranged on a decoration layer and wherein the dimensions and shapes of the decorative patterns have a lot of variances.

SUMMARY OF THE INVENTION

Preferred embodiments of the present invention have been realised with a method for manufacturing decorative surfaces as defined below.

The present invention reduces the waste of decoration layers whereon a set of decorative patterns are digital printed and to reduce the waste at the finishing (for example cutting) of the decorative workpieces, especially when the dimensions of the set of decorative patterns are different or when the shapes of the set of decorative patterns are different, an arbitrary way of arranging on the decoration layer cause more waste of decoration layer. The reduction of the waste is obtained by a nesting method. The nesting method arranges a set of decorative patterns as such that the amount of "decoration layer"-waste is much smaller than arranging the set of decorative patterns in an arbitrary way. The nesting method reduces also the environmental impact by reducing the waste of decoration layer in the manufacturing of decorative workpieces. In a nesting method it is obvious that the amount of decorative patterns in the set of decorative patterns is two or more. A nesting method takes the shape of the decoration patterns and the size of the decoration layer into account to maximize the number of decorative patterns that can be arranged on a decoration layer so no predetermined and fixed areas are needed to arrange them. The nesting method guarantees a minimum waste.

In a preferred embodiment the nested decorative patterns are printed by an inkjet print device and in a more preferred embodiment the nested decorative patterns are printed by a single pass inkjet print device.

Preferably the nesting method is a rectangular nesting method. The rectangular nesting method is preferred if the decorative patterns are rectangular shaped. To reduce the waste of decoration layer even more the nesting method is a true shape nesting method wherein the shape of the decorative patterns is taken into account when arranging the decorative patterns on the decoration layer.

The nesting method preferably arranges also the relief content of the decorative patterns so the nested relief contents matches accordingly with the nested decorative patterns when providing the nested relief contents to the nested decorative workpiece.

An advantage of a nesting method is the ability to quickly respond on specific situations during the manufacturing of decorative workpieces. For example, the current technology of digital print devices has fundamental weaknesses compared to conventional print devices such as rotogravure or offset, especially when it comes to high-speed digital printing of decorative patterns on a decoration layer. When a digital print device fails to print in a specific zone at the moment the manufacturing of the decorative workpieces have to be stopped to solve the failing of the digital print device, this has an impact on the production and manufacturing timings. The nesting method may arrange the set of decorative patterns digital printed on the decoration layer in the quality zone of a digital print device and/or in the quality zone of a cutting plotter so that the manufacturing can continue fast without the need of directly solving the failing. A specific failing of a digital print device is the malfunction of a nozzle in an inkjet print head of an inkjet print device. In a single pass inkjet print device this causes a non-printed line in the print zone of the single pass inkjet print. By preventing not to nest a decorative pattern in the non-printed line the manufacturing of the decorative workpiece can continue without maintenance the failing nozzle of the inkjet print head.

Another way to prevent digital printing of a decorative pattern in a failure zone of a single pass inkjet printer, is to reduce the print zone of the single pass inkjet print in the direction across the transport direction of the decorative layer so the quality zone has the same dimension as the print zone of the single pass inkjet printer.

Digital printing of decorative patterns for the manufacturing decorative workpieces gives the ability to react fast on the demands of the decorative workpiece market by printing on demand. The nesting method in the preferred embodiment may be prepared to react even faster by arranging decorative patterns on the decoration layer while digital printing already arranged decorative patterns on the decoration layer. In a preferred embodiment the nesting method is a nesting-on-the-fly method. Preferably in this nesting-on-the-fly method the nested decorative patterns are printed by a single pass inkjet printer.

It was noticed that high ink coverage or toner coverage in a decorative pattern may cause delaminating of the decoration workpiece or other quality issues. In a preferred embodiment a decorative pattern is selected from a decorative image as region-of-interest wherein the content of the region-of-interest is analysed by an image analysis method. The image analysis method may prevent that decorative pattern shall be nested because it is controlled that it gives quality issues in the manufacturing of decorative workpieces. The nesting method may select a region-of-interest in the decorative image which may as decorative pattern nested without quality issues such as delaminating of the decoration workpiece.

The selection may be based on the image analysis of
counting the amount of knots; and/or
measuring the size of knots; and/or
measuring the distance of a knot and the edge of a region-of-interest in the decorative image; and/or
measuring the density of wood grain lines.

The finishing, such as cutting, of a nested decorative workpiece may cause some inaccuracies therefore in a preferred embodiment a bleed area is added to a decorative pattern to compensate the inaccuracies of the finishing of the workpiece. A connect area to the decorative pattern may also be added wherein means shall be provided to attach decorative workpieces together such as a tongue-and-groove profile.

The nesting method is preferably contained in a deco digital workflow system to reduce the total waste of the manufacturing decorative workpieces. Preferably the deco digital workflow system comprises a management information system (MIS).

BRIEF DESCRIPTION OF THE DRAWINGS

FIG. 10 and FIG. 11 illustrate the obtained decorative panel (7) by the invention can have the shape of a rectangular and oblong laminate floor panel, with a pair of long sides (27-28) and a pair of short sides (29-30) and having an HDF or MDF substrate (8). In this case the panel (7) is at long at least the long sides (27-28) with coupling means (31) allowing to lock the respective sides (27-28) together with the sides of a similar panel both in a direction (R1) perpendicular to the plane of the coupled panels, as in a direction (R2) perpendicular to the coupled sides and in the plane of the coupled panels. As illustrated in FIG. 11 such coupling means or coupling parts can basically have the shape of a tongue (32) and a groove (33), provided with additional cooperating locking means (34) allowing for said locking in the direction (R2).

FIG. 10 and FIG. 11 illustrate a decoration layer (1) for incorporation in a decorative panel, obtainable by means of a method in accordance with the invention. The decoration layer (1) comprises a paper sheet provided with thermosetting resin. The thermosetting resin satisfies or fills the paper core. The paper layer has been provided with a digitally printed decorative pattern (5).

DETAILED DESCRIPTION OF THE PREFERRED EMBODIMENTS

Content Extension Area

To compensate inaccuracies in the printing process and/or finishing process and/or provide extension to a decorative pattern to mount a decorative workpiece, in, for example three-dimensional object content, extension areas have to be designed in a decorative pattern before finishing the decorative workpiece.

Examples of content extension areas are:
  glue area: an area that will be glued afterwards while mounting the decorative workpieces to a finished product;
  connect area: an area to provide means that will be attached while mounting the decorative workpieces to a finished product. An example of such means is a tongue-and-groove profile on a decorative workpiece;
  folding area: an area that will be folded and/or attached while mounting the print to a finished product. For example flaps that are needed to fold a flexible decorative workpiece, such as a vinyl tile to a box or around stair;
  bleed area: Several finishing processes are used in the manufacturing of decorative workpieces such as die cutting, kiss cutting, drill cutting, creasing, perforating, foil stamping, embossing, hi-die cutting, guillotine cutting, wet or dry laminating, V-cutting, embossing with digital embossing plate, tongue-and-groove profile producing. These finishing processes may have inaccuracies while manipulating the printed decorative patterns and/or the manufactured decorative workpieces and that's why a bleed area added to a decorative pattern may be needed.

Figure 1:
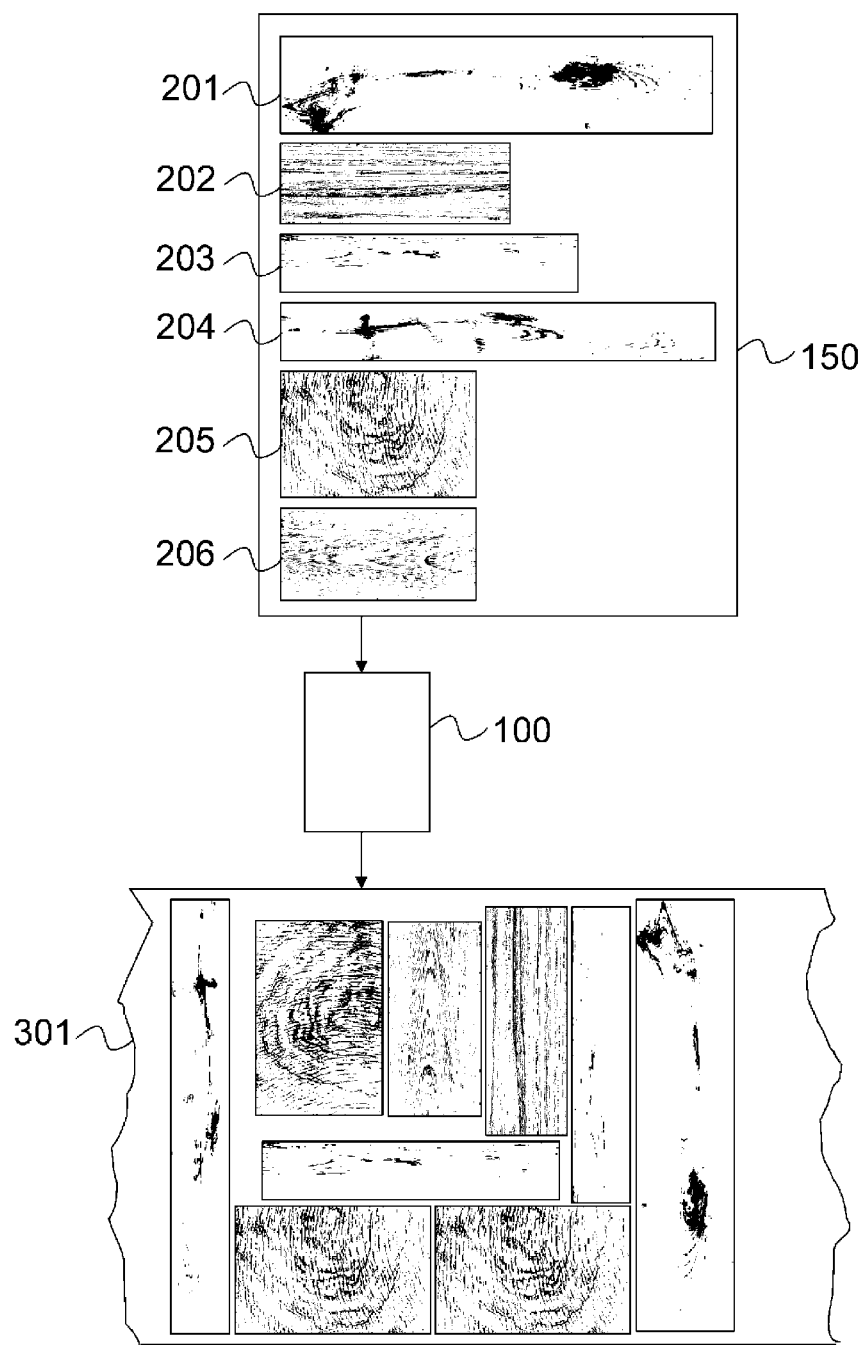
FIG. 1 illustrates a nesting method (100) of six decorative patterns (201, 202, 203, 204, 205, 206) on a flexible web (301), as decoration layer, whereon the nested decorative patterns (201, 202, 203, 204, 205, 206) are printed. Only a part of the flexible web material (301) is shown. The nesting method (100) nested one decorative pattern (206) with three copies. The waste of decoration layer is minimized in the nesting method by, for example ninety degrees rotating of decorative patterns (201, 202, 203, 204). The six decorative patterns (201, 202, 203, 204, 205, 206) are added in a nesting queue (150).
Figure 2:
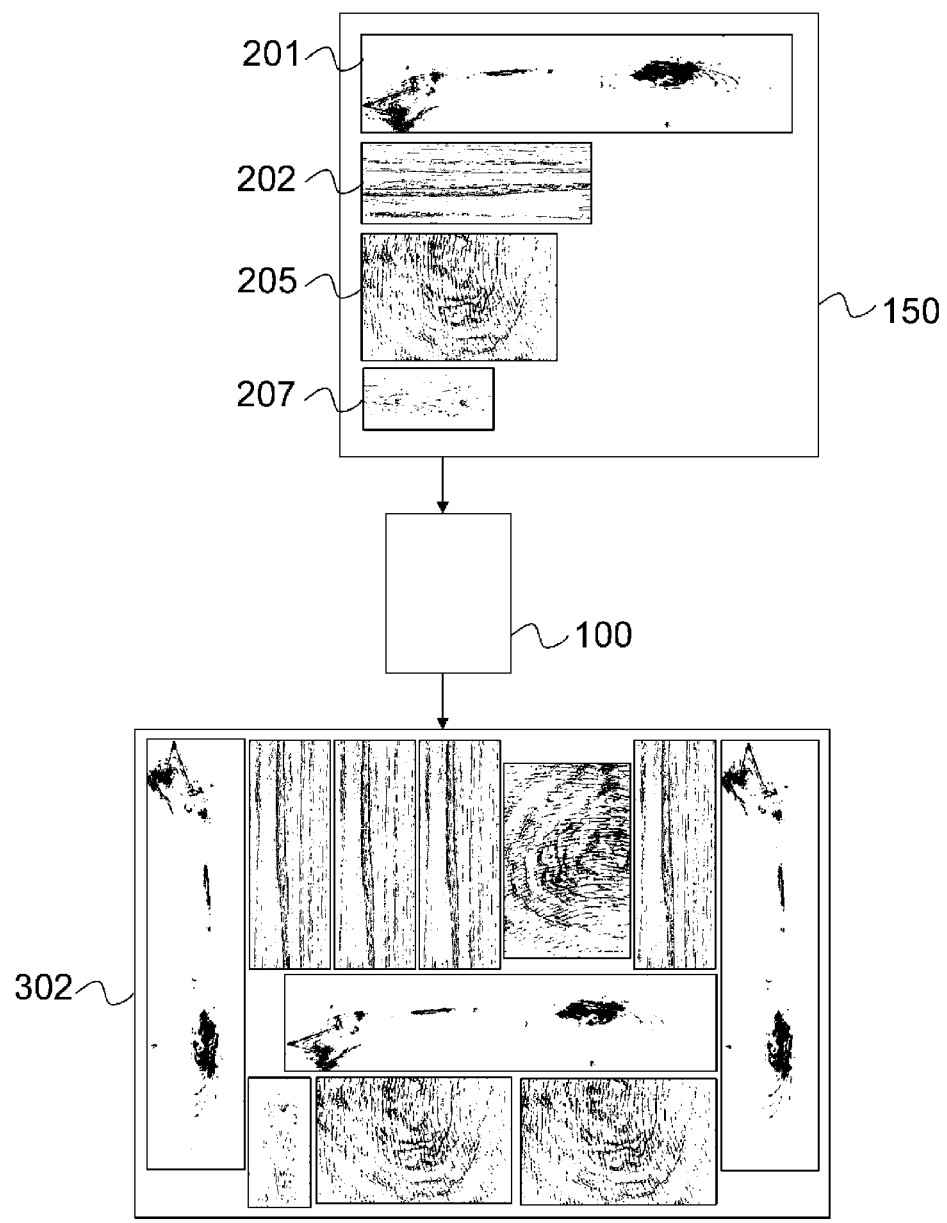
FIG. 2 illustrates a nesting method (100) of four decorative patterns (201, 202, 205, 207) on a flexible sheet (302), as decoration layer, whereon the nested decorative patterns (201, 202, 205, 207) are printed. The nesting method (100) nested a decorative pattern (201) in three copies, a decorative pattern (202) in four copies, a decorative (205) in three copies and decorative pattern (207) in one copy. The four decorative patterns (201, 202, 205, 207) are added in a nesting queue (150). The nesting method arranged the copies of the decorative patterns (201, 202, 205, 207) to minimize the waste of decoration layer. The four decorative patterns (201, 202, 203, 205, 207) are added in a nesting queue (150).
Figure 3:
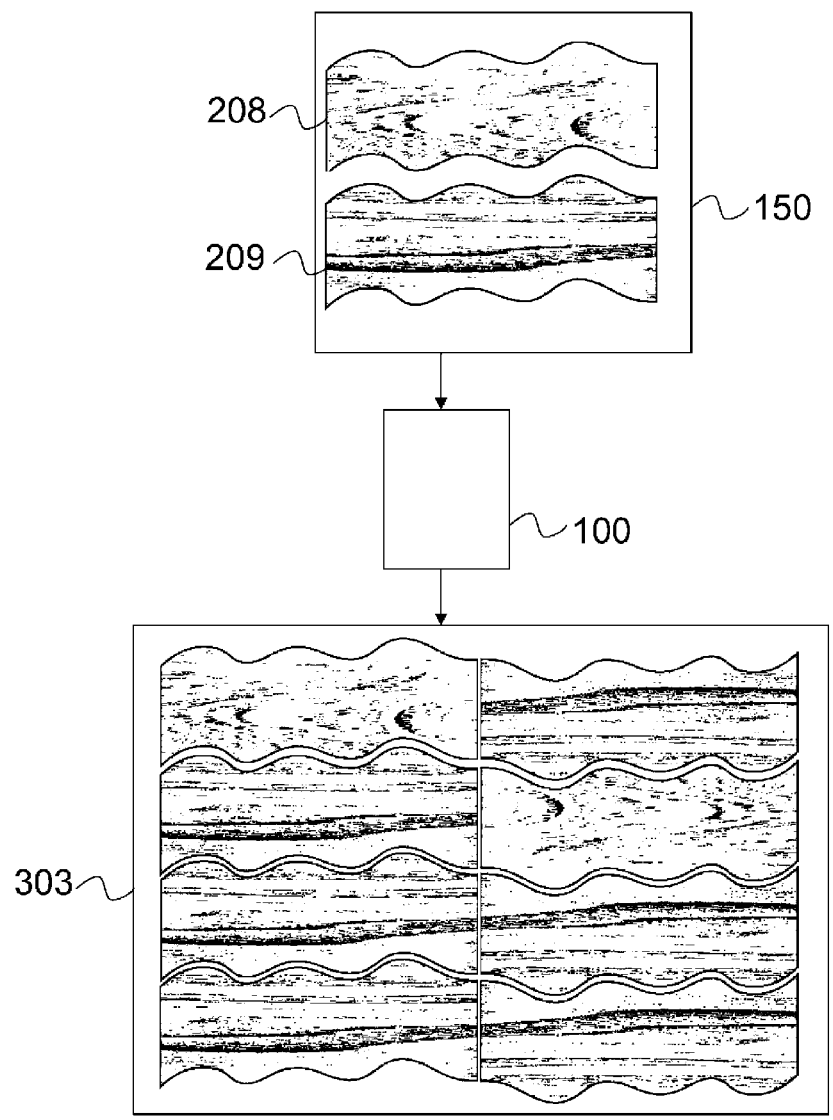
FIG. 3 illustrates a nesting method (100) of 2 non-rectangular decorative patterns (208, 209) on a flexible sheet (303), as decoration layer, whereon copies of the 2 non-rectangular decorative patterns (208, 209) are arranged and printed. The nesting method (100) nested a decorative pattern (208) in two copies and a decorative pattern (209) in 4 copies. To minimize the waste of the decoration layer, 3 copies of the decorative pattern (209) and 1 copy of the decorative pattern (208) is 180 degrees rotated.
Figure 4:
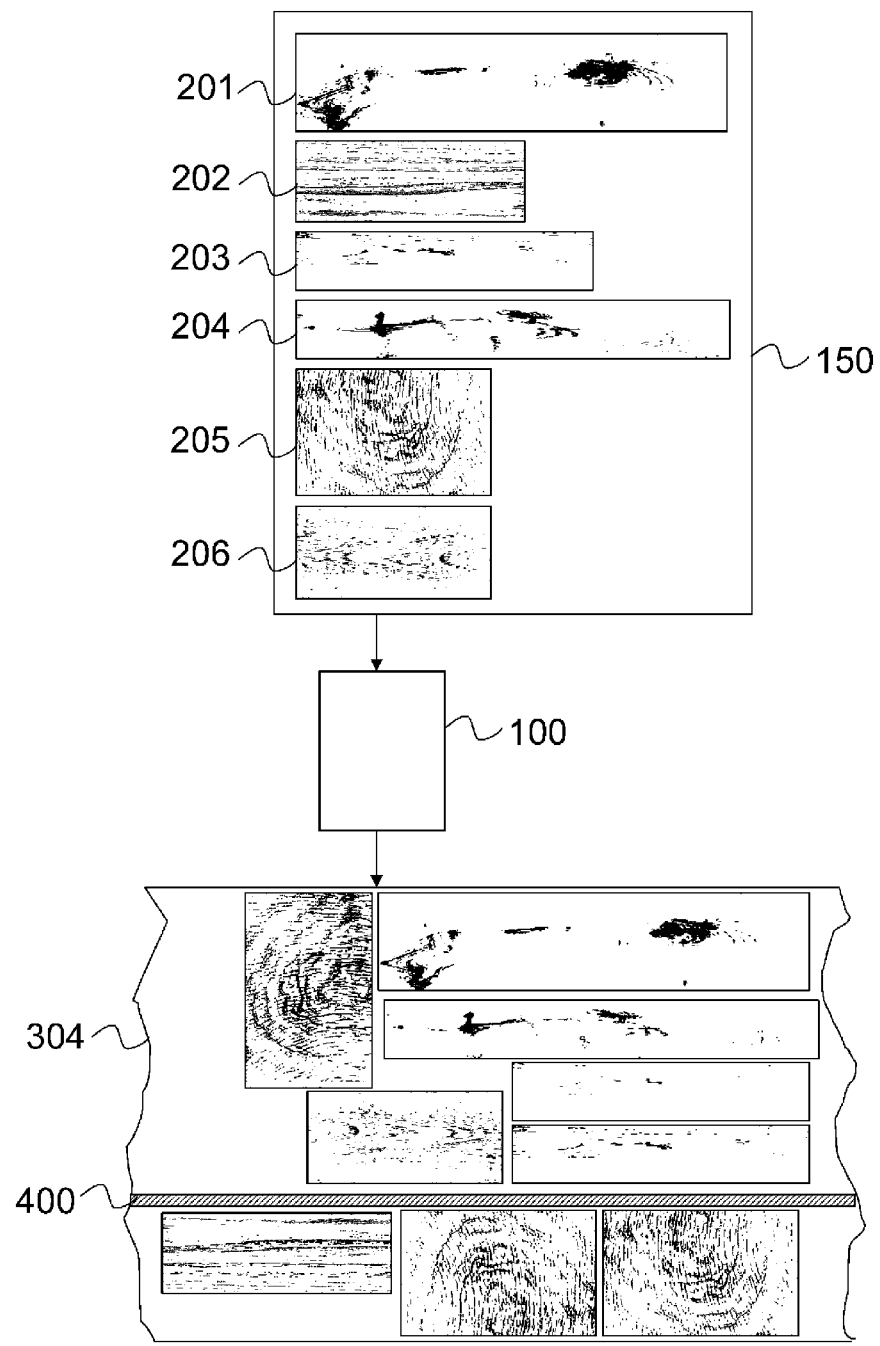
FIG. 4 illustrates a nesting method (100) of six decorative patterns (201, 202, 203, 204, 205, 206) on a flexible web (301), as decoration layer, whereon the nested decorative patterns (201, 202, 203, 204, 205, 206) are printed. Only a part of the flexible web material (301) is shown. The nesting method (100) nested a decorative pattern (206) with three copies. The six decorative patterns (201, 202, 203, 204, 205, 206) are added in a nesting queue (150). A single pass inkjet printer, not shown in the illustration, has a failure zone (400) in its printing zone. The nesting method prevents the nesting of the decorative patterns in the failure zone (400) of the printing zone. The waste of decoration layer is minimized in the nesting method by ninety degrees rotating of a copy of a decorative pattern (205).
Figure 5:
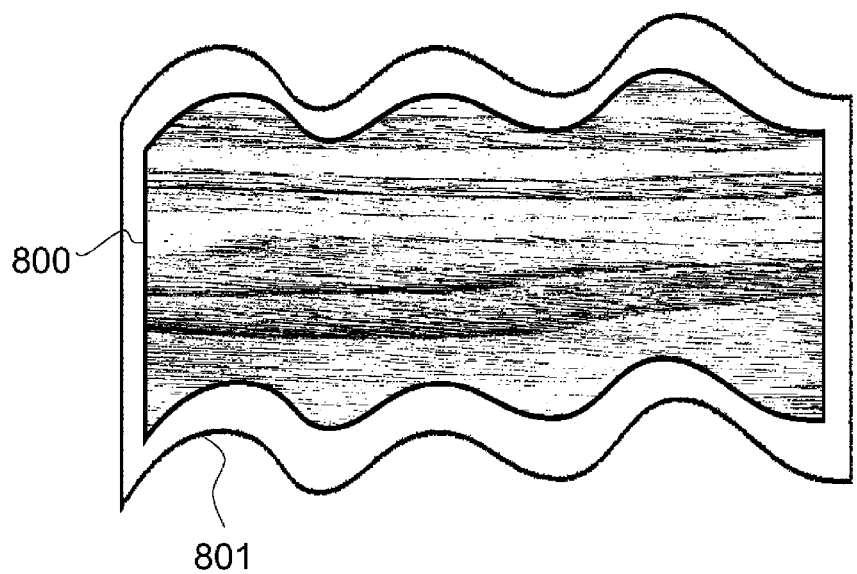
FIG. 5 illustrates the adding of a bleed area (801) to a non-rectangular decorative pattern (800) by choking the content area of the non-rectangular decorative pattern (800).
Figure 6:
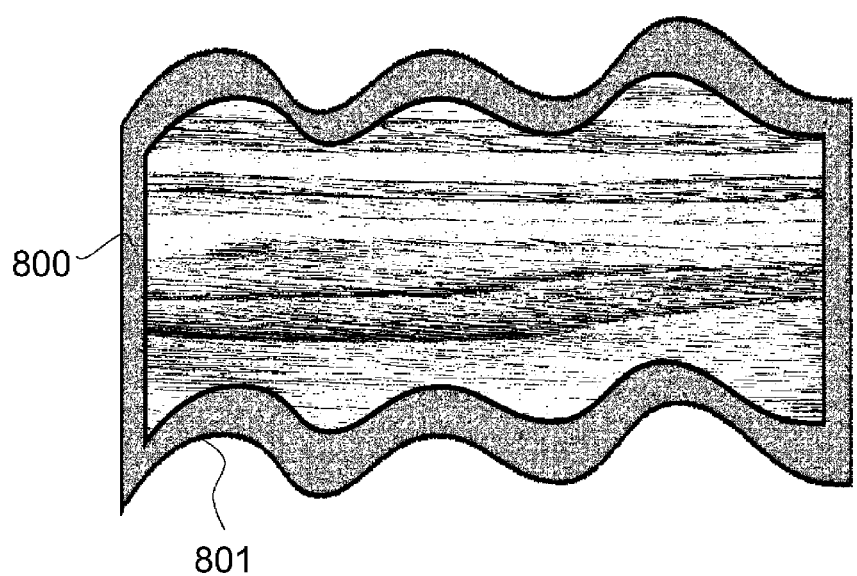
FIG. 6 illustrates the adding of a bleed area (801) to a non-rectangular decorative pattern (800) wherein the bleed area (801) is filled with the background colour of the decorative pattern (800).
Figure 7:
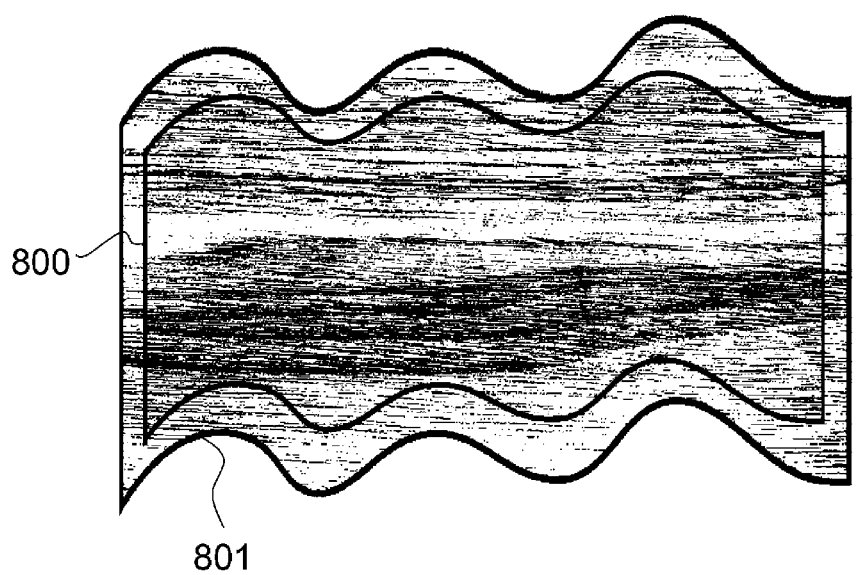
FIG. 7 illustrates the adding of a bleed area (801) to a non-rectangular decorative pattern (800) wherein the content of the decorative pattern (800) is extended until the external edges of the bleed area (801).
Figure 8:
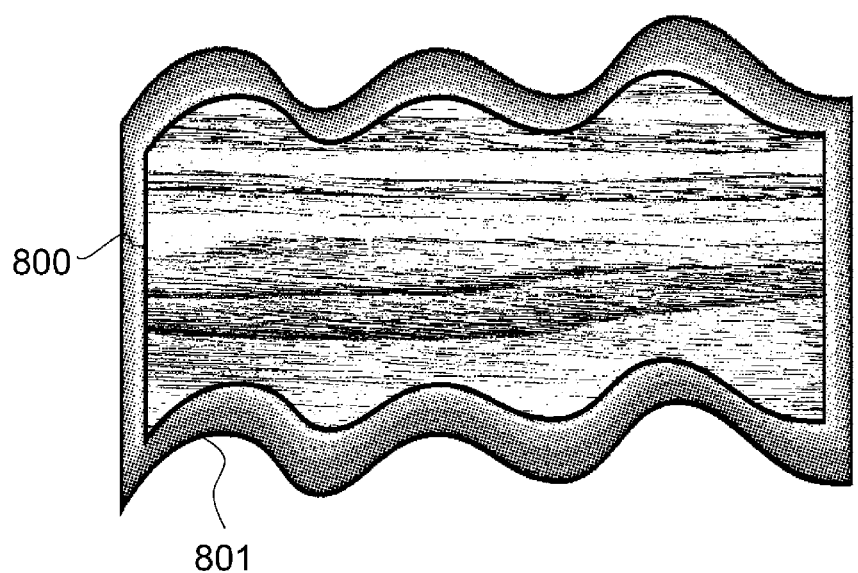
FIG. 8 illustrates the adding of a bleed area (801) to a non-rectangular decorative pattern (800) wherein the bleed area (801) is filled with a gradient from the background color to the contrast color of the decorative pattern (800).
Figure 9:
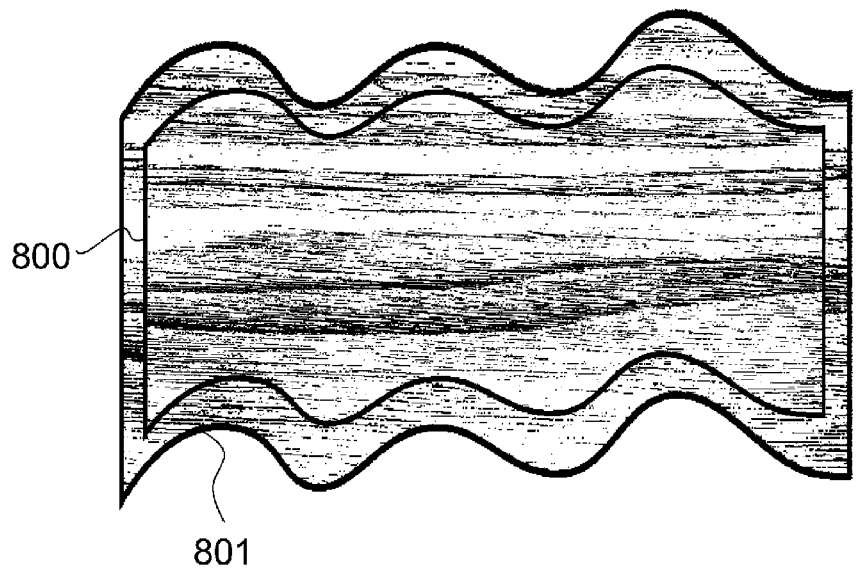
FIG. 9 illustrates the adding of a bleed area (801) to a non-rectangular decorative pattern (800) wherein the bleed area (801) is filled with cloned pixels of the decorative pattern (800).
Figure 10:
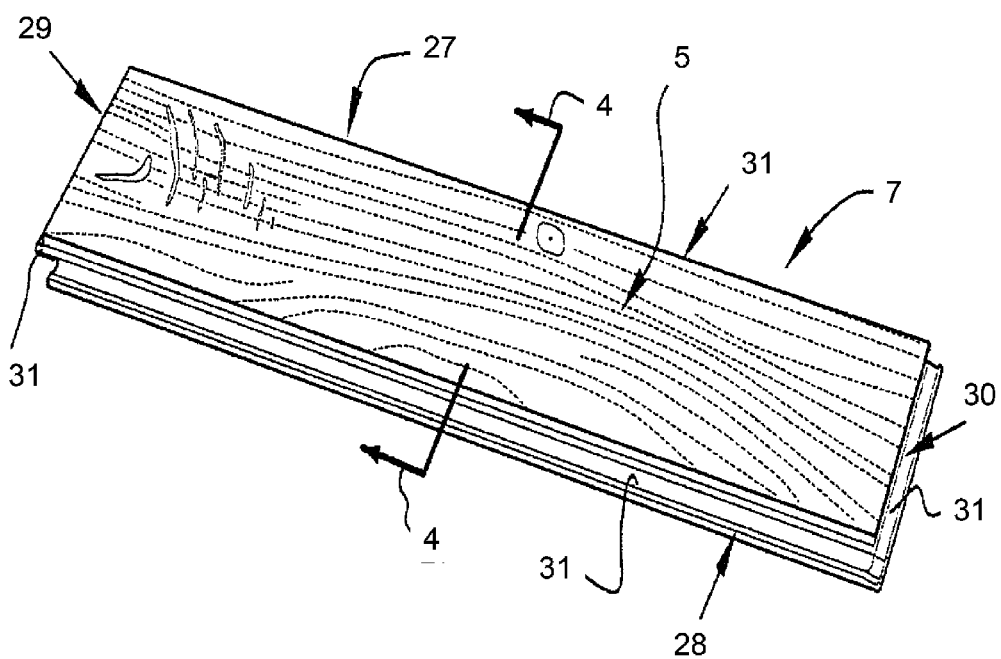
FIG. 10. illustrates the obtained decorative workpiece (7) by the invention in a perspective view of decorative workpiece (7)
Figure 11:
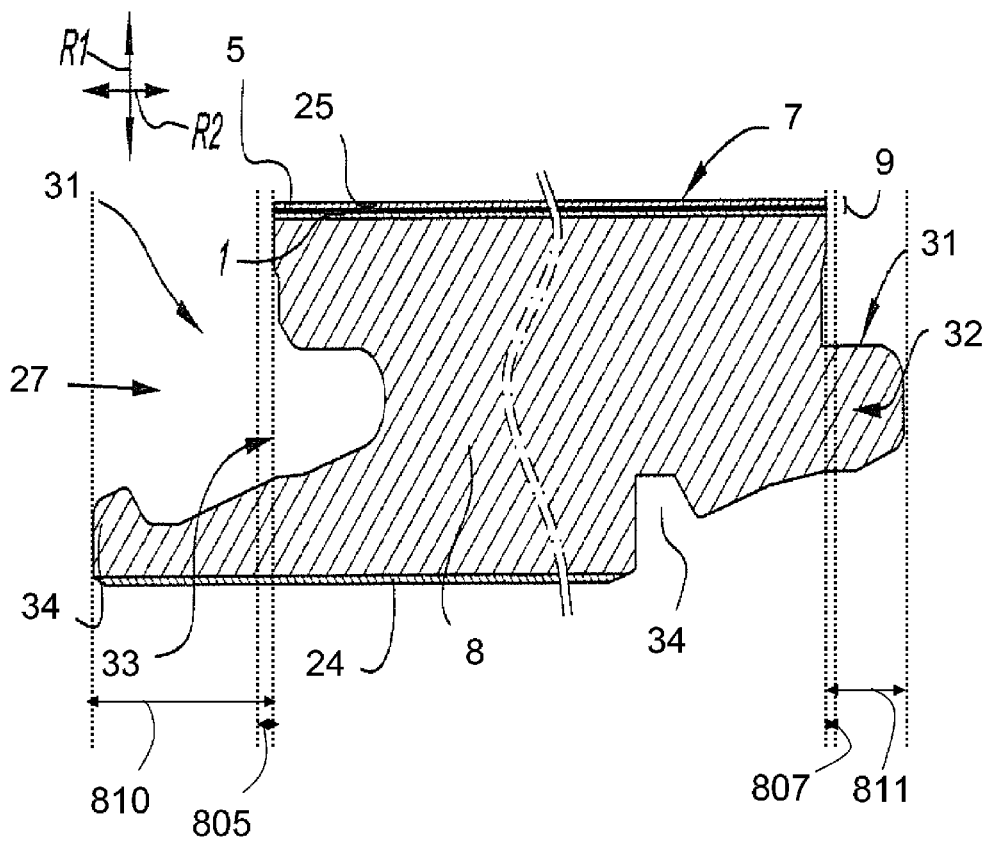
FIG. 11 is a cross section at a larger scale along the line (4) in FIG. 10.
Figure 12:
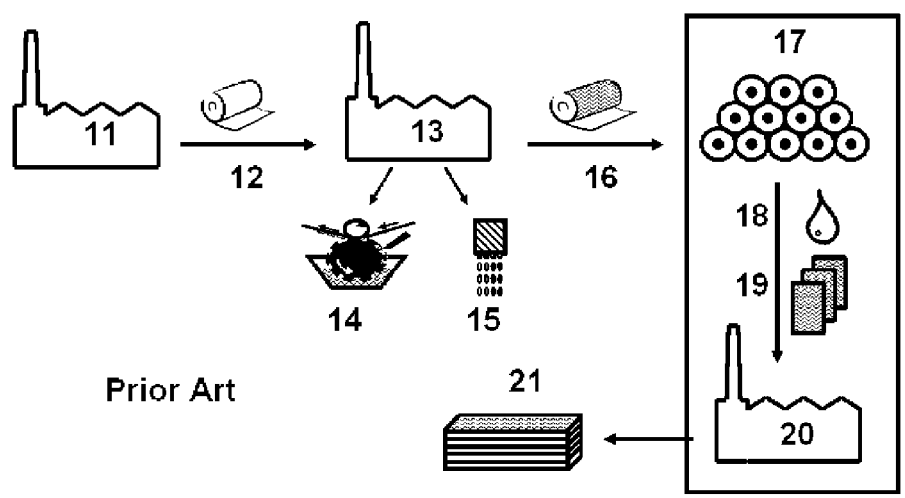
FIG. 12 shows the prior art production process for manufacturing decorative panels, wherein a paper manufacturer (11) supplies a paper roll (12) to a decor printer (13) using gravure printing (14) or inkjet printing (15) in order to deliver a decor paper roll (16) to a warehouse (17) of a floor laminate manufacturer (20). Depending on the market demand, the floor laminate manufacturer (20) selects one of the different decor rolls in his warehouse (17) to impregnate (18) and to cut to a size (19) for being heat pressed and finished into ready-to-use floor laminate (21).
Figure 13:
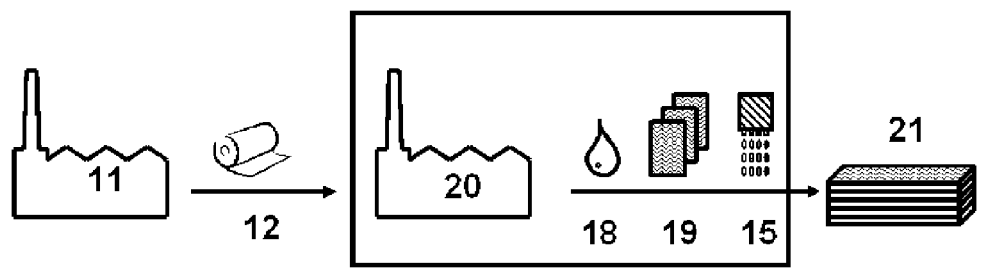
FIG. 13 shows a production process for manufacturing decorative panels, wherein a paper manufacturer (11) supplies a paper roll (12) directly to a floor laminate manufacturer (20) who impregnates (18) the paper roll (12), cuts to a size (19) for being inkjet printed (15) and then heat pressed and finished into ready-to-use floor laminate (21). The order of cutting to size (19) and inkjet printing (15) may also be reversed, i.e. printing on a impregnated paper roll before cutting to sheets.

In FIG. 11 a connect area, as content extension area may be added to the decorative pattern (5) for the tongue (32) and the locking mean (34) at the groove (33) by expanding the content area of the decorative pattern prior printing on the decoration layer (1):
  at the side of the tongue (32) expanding in 1 dimension by the distance (811), also called the tongue distance; and
  at the side of the groove (33) expanding in 1 dimension by the distance (810), also called the groove distance.

In FIG. 11 a bleed area, as content extension area, may be added to the decorative pattern (5) to compensate inaccuracies in the printing and/or finishing process:
  at the side of the tongue (32) expanding in 1 dimension by the bleed distance (807)
  at the side of the groove (33) expanding in 1 dimension by the bleed distance (805).

Bleed Area

A bleed area is an example of a content extension area that is created to compensate inaccuracies in the printing process and/or finishing process such as cutting or producing tongue-and-groove profile to a decorative workpiece. This bleed area may be created by expanding the present content area of the decorative patterns with several millimeters (for example from 2 or 5 mm). The size of expanding the content area to a bleed area depends on the inaccuracies of the printing process and/or finishing process (for example cutting).

The adding of a bleed area for a decorative pattern, which may be overruling the existing bleed area of a decorative pattern, is preferably done automatically in the preferred embodiment. This method is also called choking the content area.

This distance that expands the content area to create the bleed area is called bleed distance. The bleed distance is preferably from 0.1 mm to 10 mm, more preferably from 0.3 mm to 8 mm and most preferably from 0.3 to 15 mm. The bleed distance may be determined in the preferred embodiment but it is more preferred to determine the bleed distance automatically based on the inaccuracies of the printing and/or finishing process. It is most preferred that the bleed distance is determined depending on the content of the determined decorative patterns.

In a preferred embodiment with a nesting method, the bleed distance may be different between two nested decorative patterns on a decoration layer.

The bleed area adding preferably creates a content extension area that has the same shape as the content area with the same centre as the content area but the shape is larger than the content area wherein the centre the point is in the content area with equal distances from all points on the boundary of the content area.

A preferred embodiment may transform a bleed area of a determined decorative pattern to an optimized bleed area based on the finishing and/or cutting process.

A bleed area is an area which is not visible anymore in the decorative workpiece at the end of the manufacturing. In a bleed area one or more marks may be added wherein a mark is preferably
- a cut mark; and/or
- a saw mark; and/or
- an alignment mark; and/or
- a control mark; and/or
- an information code of the first decorative pattern; and/or
- an information code of the print parameters of the first decorative pattern; and/or
- an information text of the first decorative pattern; and/or
- an information text of the print parameters of the first decorative pattern. The reading of a code by an operator or a reading device gives the information, for example how to manufacturing the decorative workpieces in the steps after the printing of the mark or how to control the step of printing to enhance the print quality. Such information enhances the manufacturing timings and/or manufacturing qualities.

Examples of marks in the manufacturing of decorative workpieces are disclosed in EP2556962 (HUELSTA WERKE HUELS KG).

A preferred embodiment may add a mark to a content extension area and more preferably to a bleed area of a decorative pattern.

A more preferred embodiment may add a colored mark to a content extension area, more preferably a bleed area of a decorative pattern wherein the color of the mark may have a color difference with the contrast color of the decorative pattern between zero delta E in CIELab and 10 delta E in CIELab to enhance the readability of the mark.

More information about luminance, hue of colours, color differences, CIELab, CIEXYZ is disclosed in DR. R. W. G. HUNT. The reproduction of colour. 4th edition. England: Fountain Press, 1987.

Bleed Area Filling

In stead off expanding the content of the decorative pattern to fill the bleed area, other bleed area fillings may be comprised in the adding of a bleed area to a decorative pattern. Preferably image content of the decorative pattern is used to fill the bleed area. This compensates inaccuracies in the printing process and/or finishing process even better than remaining the bleed area empty, an empty bleed area becomes visible if the finishing process is not accurate enough.

The bleed area filling may selected from:
- filling the bleed area with the background colour of the decorative pattern; or
- filling the bleed area with a gradient of the background colour of the decorative pattern; or
- filling the bleed area with a gradient of the background color of the decorative pattern to the contrast color of the decorative pattern.
- cloning pixels of the decorative pattern in the bleed area; or
- mirror-wise cloning pixels, also called adverse cloning pixels, of the decorative pattern in the bleed area.

Mirror-wise cloning of pixels in a bleed area means that the bleed area with the cloned pixels is a reflection of the decorative pattern around the edge of the decorative pattern or more preferably that the bleed area with the cloned pixels is a reflection around the edge of the decorative pattern and wherein the reflection is a an area at the edge in the decorative pattern.

Nesting

A nesting method is a method to arrange a set of decorative patterns, whether or not with their content extension areas, on a decoration layer to reduce the waste of the decoration layer and to shorten the production time. The set of decorative patterns becomes nested decorative patterns on the decoration layer after applying the nesting method. In a nesting method it is obvious that the amount of decorative patterns in the set of decorative patterns is two or more. Preferably minimal two of the decoration patterns in the set of decorative patterns are selected from a different decoration image.

A processing apparatus which executes nesting processing is done by software which implements a computerized nesting method. Such software is called nesting software. The processing apparatus is preferably a computer with appropriate means to store decorative patterns such as memory and appropriate means to execute the nesting method such as a CPU.

The dimensions of the set of decorative patterns may be different in width and length for each decorative pattern.

The processing apparatus may comprise one or more Graphic Processing Unit (GPU) for faster calculation of steps in the nesting method and thus gives a higher productivity of the manufacturing of the decorative workpieces. The GPU may also be use for image manipulations such as rotation, color conversion of decorative patterns in the nesting method.

A nesting method may comprising the following steps:
- determining the amount of copies that have to be nested of a decorative pattern.
- ordering decorative patterns based on nesting priorities that where given as input while determining decorative patterns in the nesting queue in the preferred embodiment of the nesting method; and/or
- visualizing statistics of the nesting performance, for example how much free space is still available on the decoration layer; and/or
- grouping a part of decorative patterns together on a part of a decoration layer because they have to be cut together; and/or
- calculating the minimal distance and/or maximal distance between the content area and/or content extension area of two nested decorative patterns; and/or using a defined minimum interspace distance, also called margins while nesting decorative patterns so the minimal distance between the content area or content extension area of decorative patterns is equal or larger than the defined minimum interspace distance; and/or creating space to add control marks and codes on the decoration layer.

The nesting method may be based on the shape and/or dimension of the content extension area and the size of the decoration layer but preferably it is based on the shape and/or dimension of the content area and the size of the decoration layer to reduce more the waste of a substrate and to shorten the production time. If bleed areas as content extension areas of two decorative patterns are overlapping the bleed area of both decorative patterns may be recalculated to non-overlapping bled areas. For example the overlapping area of both bleed areas may be divided in two parts and each part is added to a content extension area of the decorative pattern.

The nesting method may be rectangular nesting but it is more preferably true shape nesting.

Preferably the nesting method orders the decorative patterns based on the dimensions of the content area or content extension area before filling the decoration layer.

Preferably the nesting method rotates the decorative patterns to optimize the reducing of waste. To minimize the calculation of nesting, it is preferred to rotate the decorative pattern in incremental steps while trying to fit a decorative pattern on a decoration layer.

To create variances in the decorative patterns the nesting method may mirror, rotate, change the color, preferably the hue, or change the colorway of a decorative pattern from the set of decorative patterns.

A colorway is a combination of several different combinations of colours in which a decorative pattern is printed.

The nesting method may add a bleed area to a decorative pattern from the set of decorative patterns and preferably fill the bleed area with image content of the decorative pattern. If the decorative pattern had already a bleed area the nesting method may replace the bleed area by a new bleed area and preferably fill the bleed area with image content of the decorative pattern.

The nesting method may also arrange in the same arrangement as on the decoration layer the relief contents of the set of decorative patterns so there is a correct match between the nested decorative patterns on the decoration layer and the nested relief contents that is provided by a digital relief apparatus.

Deco Digital Workflow System

To manage the printing of decorative patterns by one or more digital print devices in a method of manufacturing deco workpieces, the preferred embodiment may comprise deco digital workflow system, for example for determining decorative patterns, nesting decorative patterns, digital printing nested decorative patterns on a decoration layer and/or digital cutting nested decorative workpiece with printed nested decorative patterns to separated decorative workpieces.

To handle the mixture of decorative patterns, nested decorative patterns a deco digital workflow system is important, for example to know from each nested decorative workpiece the correct nested decorative patterns. This may be monitored by reading marks on the nested decorative workpiece wherein the readings are feed back to the deco digital workflow system.

The deco digital workflow system comprises preferably a management information system (MIS) to provide information that the manufacturing of decorative workpieces require to manage themselves efficiently and effectively and to analyze and to facilitate strategic and operational activities.

In a preferred embodiment a part of a decorative pattern is digital printed on a package wherein a decorative workpiece, whether or not with other decorative workpieces, is wrapped in the package and wherein the decorative workpiece carries the decorative pattern. Prior the wrapping of the decorative workpieces the decorative workpieces may be collected. The collected decorative workpieces are preferably cut out of a nested decorative workpiece. The digital printing of the package is preferably managed by a deco digital workflow system.

The deco digital workflow system may manage the forming of relief on a decorative workpiece or a nested decorative workpiece by digital relief apparatus.

Deco Storefront

In a preferred embodiment a cloud-based web-to-print solution may be comprised to enable decorative workpiece service providers or decorative workpiece buyers to create and manage online stores for manufacturing of decorative workpieces which is called a deco storefront.

Preferably a deco storefront is marketed as a hosted cloud service so there is no high initial investment needed in servers, software, databases or expensive symmetrical internet connections. This reduces the cost of deploying stores and improves their time-to-market.

The deco storefront may have an easy manageable store centre which is the central hub from which stores are set up and orders are tracked. Its dashboard preferably provides instant feedback about incoming orders and the status of orders that are in progress.

The deco storefront preferably comprises an online editor wherein decorative workpiece service providers or editors may design or edit decorative patterns or add decorative images. This gives the ability to the decorative workpiece service providers an innovative way of creating personalized decorative workpieces.

The integration of the deco storefront in a deco digital workflow system may increase the efficiency by saving time in for example the automatically downloading and processing orders of decorative workpieces.

Nesting Queue

The nesting method may have a step of determining decorative patterns that have to be arranged on one or more decoration layers; and/or may have a step of determining decorative images whereof one or more decorative patterns are taken as region-of-interests from the decorative image to be arranged on one or more decoration layers The determination is preferably done by adding the decorative patterns and/or decorative images in a queue, also called the nesting queue.

The nesting method preferably provides a method to visualize the nesting queue and the arrangement of the determined decorative patterns on a decoration layer. Preferably the visualization is by visualizing thumbnails of the content of the decorative patterns and more preferably the visualization is by visualizing information of the determined decorative patterns such as decorative pattern name, creator name, amount of copies that need to be nested or the preferred rotation.

Nesting-on-the-Fly

To reduce the waste of a decoration layer which is a flexible web material printed by a digital printer, the priority of arranging a set of decorative patterns on the decoration preferably has a first priority: arranging across the flexible web material and as second priority: arranging along the flexible web material.

The digital printer, preferably an inkjet printer, may perform this nesting method while printing already arranged decorative patterns, whether or not with their content extension areas, from the set of decorative patterns on the decoration layer to increase the production time of nested decorative workpieces. This preferred nesting method is also called nesting-on-the-fly. Preferably nesting-on-the-fly comprises the merging of image content from a part of the set of decorative patterns to minimize the waste across the flexible web material, as decoration layer, while printing. The merging of the image content of decorative patterns is easy established because decorative patterns are defined in a raster graphics format. Preferably the merging of the image content of decorative patterns comprises the step of merging the scan-lines of the decorative patterns. A scan-line is one line, or row, in a raster graphics format.

The nesting-on-the-fly method may be performed by workstations with a fast CPU such as, an Intel Xeon w3550 which has 4 cores at 3.06 GHz. Preferably these nesting-on-the-fly workstations comprises more than one CPU to follow the print speed to print the nested decorative patterns while performing the nesting-on-the-fly, more preferably more than 4 CPU's to follow the print speed to print the nested decorative patterns while performing the nesting-on-the-fly and most preferably more than 8 CPU's to follow the print speed to print the nested decorative patterns while performing the nesting-on-the-fly.

The nesting-on-the-fly workstations may comprise to calculate steps in the merging of the nested decorative patterns one or more Graphic Processing Units (GPU).

Preferably the set of decorative patterns is a dynamic set wherein decorative patterns may be added while performing nesting-on-the-fly. Because nesting-on-the-fly makes the possibilities of nesting more dynamically: for example a decorative pattern which is not yet arranged on the decoration layer may get a higher nesting priority and thus shall be nested earlier on the decoration layer. Also in nesting-on-the-fly a decorative pattern which is not yet arranged on the decoration layer may be removed if, for example the production of the decorative pattern is not needed anymore.

Nesting-on-the-fly method is preferably performed in the manufacturing of decorative workpieces wherein the nested decorative patterns are printed by a single pass inkjet printer.

Nesting-on-the-fly method may comprising a rectangular nesting method or true-shape nesting method.

Rectangular Nesting

The method of rectangular nesting uses a rectangle around the shape of the content area or content extension area, such as bleed area, of a decorative pattern with largest height and width. The shape of the content area or content extension area, such as bleed area, of the decorative pattern is than treated as the geometry of the rectangle and not the real shape of the content area and/or content extension area, such as bleed area, of the decorative pattern when placing the decorative pattern on the sheet while nesting. This method is a fast nesting method and reduces the waste of a substrate.

True Shape Nesting

The method of true shape nesting identifies a portion of the actual shape of the content area or content extension area, such as bleed area, of a decorative pattern. For example the left side and bottom of the actual shape of the content area or content extension area, such as bleed area, of a decorative pattern is examined to determine how well it fits with adjacent shape of content area's or bleed area's of other decorative patterns. The top and the right side of the actual shape of the content area or content extension area, such as bleed area, of a decorative pattern are ignored until another decorative pattern is placed next to it.

Preferably while using true shape nesting in a preferred embodiment the decorative patterns that are already placed on the decoration layer remain stationary and only newly decorative patterns are considered for arrangement and rotation. The purpose of this heuristic rule is to eliminate most of the calculation of nesting. This heuristic rule is sometimes called "first fit".

The true shape nesting preferably comprises the following steps a) ordering the decorative patterns from largest to smallest surface of content area or bleed area;

b) placing the largest decorative pattern on the decoration layer;

c) rotating the decorative pattern to the orientation that brings it closest to a corner of the decoration layer, also called the nesting corner;

d) placing the next largest decorative pattern on the decoration layer;

e) rotating the decorative pattern to the orientation that brings it closest to the nesting corner;

f) repeating steps d) and e) until all decorative patterns are nested or until no more decorative patterns will fit on the decoration layer.

True shape nesting may take the whole shape of the content area or content extension area, such as bleed area, of a decorative pattern into account while optimal filling a decoration layer and preferably multiple decorative patterns are observed to fill a decoration layer without a time consuming trial and error process of rotating decorative patterns in hundreds of small increments to check for a fit.

Another preferred method of true shape nesting is a neighbourhood search nesting method. An example of a neighbourhood search nesting method is disclosed in "Fast Neighborhood Search for the Nesting Problem" by BENNY KJAER NIELSEN et al, in Technical Report 03/03, Department of Computer Science, University of Copenhagen and this preferred method of true shape nesting is optimized with method to solve the travelling salesman problem (TSP) such as Guided Local Search (GLS) and Fast Local Search FLS). Theory and methodology about these guided local search and fast local search and the travelling salesman problem is disclosed in "Guided local search and its application to the travelling salesman problem" by CHRISTOS VOUDOURIS et al, in European Journal of Operational Research 113 (1999) p 469-499.

True shape nesting may nest a group of decorative patterns that have a best fit together by the shape of their content area's or content extension area's independently of the decoration layer whereon is nested and than nest this group of decorative patterns with the other decorative patterns.

Graphic Processing Units

Graphic Processing Units (GPU's) have been used to render computer graphics for years. Nowadays they are also used for general-purpose tasks due to their highly parallel structure, making them more efficient than Central Processing Units (CPU's).

GPU's can be combined with CPU's to achieve greater performance. In this way, serial parts of the code would run on the CPU and parallel parts would do it on the GPU. While CPU's with multiple cores are available for every new computer and allow the use of parallel computing, these are focused on having a few high performance cores. On the other hand, GPU's have an architecture consisting of thousands of lower performance cores, making them especially useful when large amount of data have to be processed.

One of the most popular tools available on the market of GPU computing is CUDA. CUDA is a parallel computing platform and programming model created by Nvidia™ and available only for their GPU's. The main advantage of CUDA is its ease of use, using the language known as CUDA C which is essentially an extension of C, with similar syntax and very easy to integrate in a C/C++ environment.

The CUDA processing flow is as follows: The needed data is first copied from the main memory to the GPU memory (①), the CPU sends an instruction to the GPU (②), the GPU executes the instruction in all the parallel cores at the same time (③), and the result is copied back from the GPU memory to the main memory (④).

CUDA parallel execution units consist of threads grouped into blocks. Combining the use of blocks and threads the maximum number of available parallel units can be launched, which for the latest GPU's can be more than 50 million. Even though this is a great amount of parallel capability, there are some cases where data might exceed the limit. In those cases, the only possibility is to iterate through the grid of millions of parallel units as many times as needed till all the data is processed.

Decorative Image

A decorative image is an image representing wood, stone, rock or fantasy pattern.

A decorative image is achieved by suitable commercially available hardware, such as scanning a photograph or taking an image by a digital camera, and commercially available software, such as Adobe Photoshop™ to manipulate and create decorative images.

The content of a decorative image is preferable defined in raster graphics format such as Portable Network Graphics (PNG), Tagged Image File Format (TIFF), Adobe Photoshop Document (PSD) or Joint Photographic Experts Group (JPEG) or bitmap (BMP) but more preferably in vector graphics format, wherein the decorative image as raster graphics format is embedded. Preferred vector graphics formats are Scale Vector Graphics (SVG) and AutoCad Drawing Exchange Format (DXF) and most preferably the decorative image is embedded in a page description language (PDL) such as Postscript (PS) or Portable Document Format (PDF).

A decorative image may be stored and/or loaded as one or more files on a memory of a computer. The preferred embodiment may comprise a method to load a decorative image into a memory of a computer.

A two-dimensional or three-dimensional representation of the relief, also called relief content of a decorative image, may be embedded in the decorative image. The two-dimensional representation of the relief only defines a fixed impression height of the relief and a three-dimensional representation of the relief defines variable impression heights.

Decorative Patterns

The decorative pattern is a region-of-interest from a decorative image so variances in decorative patterns may be achieved by selecting different region-of-interests in the decorative image. The ratio of the area of such a region-of-interest as decorative pattern and the area of the decorative image is preferably between 50% and 100%, more preferably between 10% and 100% and most preferably between 1% and 100%. The area with the content of the region-of-interest as decorative pattern is also called content area. The size of the region-of-interest and thus the decorative pattern may have a width between 50 mm and 4000 mm, and a length between 100 mm and 6000 mm or more.

A two-dimensional or three-dimensional representation of the relief for the decorative pattern, also called relief content of a decorative pattern, may be embedded in the decorative pattern. The two-dimensional representation of the relief only defines a fixed impression height of the relief and a three-dimensional representation of the relief defines variable impression heights.

A decorative pattern is preferable rectangular shaped but it can also be triangular, quadratic, rectangular, heptagonal, pentagonal and octagonal, or elliptical shaped. A decorative pattern may have a side with 1 or more curved parts. The advantage of rectangular shaped decorative patterns is the ease of cutting to a decorative workpiece, which may be a step of the preferred embodiment. Rectangular or non-rectangular shaped decorative patterns may be cut by cutting plotters. The use of cutting plotters is more time-consuming but non-rectangular shaped decorative patterns expand the amount of assembling creations of decorative workpieces such as mosaic flooring with laminates, or design furniture.

The content of a decorative pattern is preferable defined in raster graphics format such as Portable Network Graphics (PNG), Tagged Image File Format (TIFF), Adobe Photoshop Document (PSD) or Joint Photographic Experts Group (JPEG) or bitmap (BMP) but more preferably in vector graphics format, wherein the decorative pattern as raster graphics format is embedded. Preferred vector graphics formats are Scale Vector Graphics (SVG) and AutoCad Drawing Exchange Format (DXF) and most preferably the decorative pattern is embedded in a page description language (PDL) such as Postscript (PS) or Portable Document Format (PDF).

A decorative pattern may be stored and/or loaded as one or more files on a memory of a computer. The preferred embodiment may comprise a method to load a decorative pattern to a memory of a computer.

A decorative pattern may be an element of a queue of decorative patterns that is generated from variable-data printing (VDP), also known as variable-information printing, which is a form of digital printing, including on-demand printing, in which elements such as text, graphics and images may be changed from one printed piece to the next, without stopping or slowing down the printing process and using information from a database or external file. The generated decorative patterns from a variable-data printing method may be nested on one or more decoration layers.

The background color of a decorative pattern is defined by the tone of the decorative pattern. The tone in a decorative pattern may be calculated by determine the color in the color histogram of the decorative which appears the most in the decorative pattern. The background color is also called the wood color if the decorative pattern represents a wood.

The contrast color of a decorative pattern is a color in the decorative pattern which has the highest colour difference with the background color such as the highest delta E in CIELab.

If the decorative pattern represents a wood the density of wood grain lines is defined by the density of the wood nerves. A higher density of wood grain lines may be caused by smaller growth rings in the wood.

Selecting Region of Interest

In a preferred embodiment the decorative pattern is determined from a decorative image based on the content in the decorative image. The selection may comprise an image analysis on the content in the decorative image such as wood grain imperfections detection and preferably comprises an image analysis on knots and/or cracks, as wood grain imperfection, in the decorative image. The image analysis may comprise fast Fourier transformations (FFT), histogram calculations and filtering methods.

By determining the amount of knots or cracks, the selection may avoid that the amount of knots in a region-of-interest of the decorative image is larger than the determination; and/or by determining the size of a knot or cracks, the selection may avoid that the size in diameter of a knot in a region-of-interest of the decorative image is larger than the determination; and/or by determining the maximum distance from a knot or crack to the edge of a region-of-interest may avoid that a knot or crack in a region-of-interest of the decorative image is positioned nearby at the edge of the region-of-interest; and/or by determining the density of the wood grain lines, the selection may avoid that the density of the wood grain lines in a region-of-interest of the decorative image is smaller than the determination or larger than the determination.

These determination results in easier finishing of a workpiece such as cutting and digital embossing because a knot and crack influences the amount of ink on the position of printed knots or cracks on the decoration layer which, for example may give delaminating issues of a workpiece.

The apparatus that performs the image analysis on a decorative image or decorative pattern may comprise one or more Graphic Processing Units (GPU).

Decoration Layer

A decoration layer is a layer comprised in a decorative workpiece or a nested decorative workpiece. The decoration layer carries a decoration layer in a decorative workpiece or the decoration layer carries two or more decorative patterns in a decorative workpiece. If the decoration layer carries two or more nested decorative pattern in a decorative workpiece, the decorative workpiece is called a nested decorative workpiece. The nested decorative workpiece is cut up to a plurality of decorative workpieces. The nested decorative workpiece is preferably cut by a cut device such as a saw but preferably by a cutting plotter to separate decorative workpieces with each of the decorative pattern that were nested.

The size of a decoration layer if it is a sheet may have a width between 50 mm and 4000 mm and a length between 100 mm and 6000 mm. If the decoration layer is a web that width may between 50 mm and 4000 mm.

The decorative pattern printed on the decoration layer may be printed by a digital printer, preferably an inkjet print device.

The decorative pattern may be printed directly on wood-based panels as decoration layer, more preferably be printed directly on chipboard, particleboard, medium density fiber board panel (MDF), high density fiber board panel (HDF) or a substrate consisting of or essentially made of wood particleboard and most preferably be printed on a rigid sheet, flexible sheet or a flexible web material.

Rigid sheets may be selected from hard board, PVC, carton, wood and wood with an ink receiver. The rigid sheets preferably have a thickness from 3 mm to 3 centimeters and more preferably have a thickness from 3 mm to 5 centimeters.

Flexible sheet may be selected from cellulose-based material, paper, impregnated paper, resin pre-impregnated paper, transparency foils, PVC sheets with thickness from 0.5 micrometer to 100 micrometers and preferably from 0.5 micrometer to 50 micrometers.

Flexible web material may be selected from cellulose-based material, paper, vinyl, fabrics, PVC or textile which is used in so called roll-to-roll digital printers.

The decoration layer, as flexible sheet or flexible web material, is preferably a paper with a weight from 50 to 150 $g/m^2$.

In a preferred embodiment the manufacturing of the decorative workpieces comprises the step of resin impregnation of the decoration layer and in a more preferred embodiment the decoration layer is impregnated prior digital printing of a decorative pattern on the substrate and in a most preferred embodiment the decoration layer is in a first step impregnated and in a second step coated with an ink receiver prior inkjet printing the decorative pattern on the ink receiver by an inkjet print device.

Decoration Paper

A decoration paper is a decoration layer, which is also called deco paper. In a preferred embodiment the decoration layer is a decoration paper.

The decoration paper preferably has a weight of less than 150 $g/m^2$, because heavier decoration paper is hard to impregnate all through their thickness with a thermosetting resin. Preferably said decoration paper has a paper weight, i.e. without taking into account the resin provided on it, of between 50 and 130 $g/m^2$ and preferably between 70 and 130 $g/m^2$. The weight of the paper cannot be too high, as then the amount of resin needed to sufficiently impregnate the paper would be too high, and reliably further processing the printed paper in a pressing operation becomes badly feasible.

Preferably, the decoration paper has a porosity according to Gurley's method (DIN 53120) of between 8 and 20 seconds. Such porosity allows even for a heavy sheet of more than 150 $g/m^2$ to be readily impregnated with a relatively high amount of resin.

Suitable decoration paper having high porosity and their manufacturing are also disclosed by U.S. Pat. No. 6,709,764 (ARJO WIGGINS).

The paper for the decoration layer is preferably a white paper and may include one or more whitening agents, such as titanium dioxide, calcium carbonate and the like. The presence of a whitening agent helps to mask differences in colour on the core layer which can cause undesired colour effects on the colour pattern.

Alternatively, the paper for the decoration layer may be a bulk coloured paper including one or more colour dyes and/or colour pigments. Besides the masking of differences in colour on the core layer, the use of a coloured decorative paper reduces the amount of inkjet ink required to print the colour pattern. For example, a light brown or grey paper may be used for printing a wood motif as colour pattern in order to reduce the amount of inkjet ink needed.

In a preferred embodiment, unbleached Kraft paper is used for a brownish colored decoration paper in the decoration layer. Kraft paper has a low lignin content resulting in a high tensile strength. A preferred type of Kraft paper is an absorbent Kraft paper of 40 to 135 $g/m^2$ having a high porosity and made from clean low kappa hardwood Kraft of good uniformity.

Resin Impregnation Method

In a preferred embodiment the decoration layer, which carries a decorative pattern, is provided with an amount of resin, more particularly is soaked in resin and/or is impregnated with resin, also called a resin impregnation method.

This resin impregnation method is the preferred method in the preferred embodiment of manufacturing of decorative workpieces wherein decorative workpieces are laminate panels, in the first place laminate floor panels, however, in the second place also laminate panels for other purposes, such as for furniture, partition walls and the like. The decorative workpieces manufactured with a resin impregnation method may also be profiles used in furniture's or skirting boards.

Preferably the resin is a thermosetting resin and more preferably the thermosetting resin is a melamine based resin, more particularly a melamine formaldehyde based resin with formaldehyde to melamine ratio of 1.4 to 2. Other thermosetting resins may be ureum-formaldehyde based resins and phenol-formaldehyde based resins.

The resin impregnation method may be a high pressure decorative workpiece method such as high pressure laminate method (HPL) or direct pressure workpiece method such as direct pressure laminate method (DPL). Direct pressure workpiece method is a method of fusing a surface, inner layers and backing layers in a single pressing operation to manufacture a workpiece or nested workpiece.

Examples of resin impregnation methods for decorative workpieces are disclosed in WO2009153680 (FLOORING INDUSTRIES).

In a preferred embodiment with a resin impregnation method, it may comprise method of applying a relief on the top layer of the decorative workpiece with a digital relief apparatus.

Overlay

In the manufacturing of a decorative workpiece with resin impregnation methods an overlay may be used to protect the decorative pattern and to improve the abrasion resistance of the decorative workpiece. In a preferred embodiment the decoration layer is at the same time the overlay in the manufacturing of the decorative workpiece and wherein the decorative pattern is printed, preferably mirrored printed, on the bottom of the overlay.

Digital Relief Apparatus

Preferably a relief may be formed on the decorative workpiece or nested decorative workpiece. Such relief can be provided in accordance with the printed decorative pattern or printed nested decorative patterns. In the case of an imitation of wood, the relief may imitate, for example, a natural relief of wood, in the form of impressions representing the pores and the like, in accordance with the printed wood decorative pattern. In the case of an imitation of stone, also the natural relief of a stone species can be imitated in accordance with the printed decorative pattern, and/or impressions can be formed for representing lower-situated cement grout lines and the like. The relief is formed by a digital relief apparatus.

The relief may be formed by jetting the relief as cured inkjet droplets, jetted by an inkjet print device, and more preferably UV cured inkjet droplets. The relief formed by the cured inkjet droplets may be printed on top of other cured or pin-cured inkjet droplets to create variances of height in the relief.

Most preferably the relief is formed by pressing a digital embossing plate against the top layer of the decorative workpiece or nested decorative workpiece.

Digital Embossing Plate

A digital embossing plate is a plate which comprises elevations that can be used to form a relief on decorative workpiece by pressing the digital embossing plate against the top layer of the decorative workpiece or nested decorative workpiece. The elevations are cured inkjet droplets, jetted by an inkjet print device, and most preferably UV cured inkjet droplets. The elevations are preferably formed by printing and curing inkjet droplets on top of already cured or pin-cured inkjet droplets. The plate is preferably stiff by using metal or hard plastic.

An alternative of a digital embossing plate may be a digital embossing cylinder which is a cylinder that comprises the elevations to form a relief on decorative workpieces by pressing and rotating the digital embossing cylinder against the top layer of the decorative workpiece or nested decorative workpiece. The elevations on the digital embossing cylinder are cured inkjet droplets, jetted by an inkjet print device, and most preferably UV cured inkjet droplets. The elevations are preferably formed by printing and curing inkjet droplets on top of already cured or pin-cured inkjet droplets.

Digital Print Device

Today, more and more digital print devices are developed for the reproduction of decorative patterns. Several digital printing technologies are used such as electro-photography, thermal transfer, dye sublimation and ink jet systems to name a few. In this document a digital print device may be referred as digital printer.

An example of a digital print device is disclosed in EP2565778 A (BROTHER IND LTD) where the digital printer performs printing based on operation in a host connected to a USB-port and wherein a print processing method is executed by the digital printer.

The decorative patterns are preferably printed by a digital print device, more preferable by an inkjet print device, also called an inkjet printer and most preferably by a single pass inkjet print device, also called a single pass inkjet printer.

The inkjet print head in an inkjet print device normally scans back and forth in a transversal direction across the moving decoration layer. Often the inkjet print head does not print on the way back. Bi-directional printing is preferred in the preferred embodiment for obtaining a high area throughput.

Another preferred printing method is by a "single pass printing process," which can be performed by using page wide inkjet print heads or multiple staggered inkjet print heads which cover the entire width of the decoration layer. In a single pass printing process the inkjet print heads usually remain stationary and the substrate surface is transported once under the inkjet print heads.

A preferred print head for an inkjet printing system in a preferred embodiment is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the manufacturing method according to the present invention is not restricted to piezoelectric inkjet printing. Other inkjet print heads can be used and include various types, such as a continuous type.

More information about inkjet print devices is disclosed in STEPHEN F. POND. Inkjet technology and Product development strategies. United States of America: Torrey Pines Research, 2000. ISBN 0970086008.

Preferably in a preferred embodiment with nesting method may providing a method to transfer the nested decorative patterns on one or more decoration layers to a digital printer so it can be printed on a digital printer. The transfer of the nested decorative patterns is done by appropriate means, for example computer network or USB-port in a appropriate raster image format, vector image format or page description language such as PostScript (PS) or Page Description Format (PDF).

However, in a digital print device and especially in an inkjet print device, there are a number of fundamental weaknesses compared to the conventional print devices, such as rotogravure, especially when it comes to the high-speed printing of decorative patterns on a decoration layer for the manufacturing of decorative workpieces.

A part in the printing zone of a digital print device may fail to print on the decoration layer, such as malfunctions of a nozzle or inkjet print head in an inkjet print device or malfunctions on a photoconductor drum in a xerography process of a digital print device. Or a part in the printing zone of a digital print device may fail to print qualitative on the decoration layer. Such parts in the printing zone are called a failure zone in the printing zone. A part in the printing zone which is not a failure zone in the printing zone is called a quality zone in the printing zone. In a preferred embodiment with a nesting method, the nesting method may prevent the printing of nested decorative patterns in a failure zone in the printing zone. The preferred embodiment with a nesting method may nest a decorative pattern with its content extension area, such as bleed area or connect area, wherein the decorative pattern is printed in the quality zones of the printing zone and a part of the content extension area, such as bleed area or connect area, is positioned or printed in a failure zone in the printing zone.

The detection of failure zones in the printing zone may be done by visual monitoring and measuring the print quality while printing the nested decorative patters on the digital print device and/or visual monitoring and measuring marks, printed by the digital print device, on the decoration layer. Preferably the visual monitoring is done by inspection cameras.

Cutting Plotter

Cutting plotter is a device to cut a decorative workpiece out of a nested decorative workpiece. The most common cutting device is a digital finishing table, also called digital cutting table or table cutter. The digital finishing table may have a vacuum table that holds the nested decorative workpiece while finishing the nested decorative workpiece.

The cutting of the nested decorative workpiece is mainly done with rotary cutters but other technologies such as sharp knives, laser, water-jet, punches, shear blades, plasma cutting, ultrasonic knifes, milling tools and flame cutting can also be used.

An example of table cutter is disclosed in EP2455184 (MIMAKI ENGINEERING COMPANY) wherein a gantry moves over the bed in a first direction and a head with cutting tools is moving along the gantry in a second direction.

The content area and/or content extension area, such as connect area or bleed area, of a nested decorative pattern in a nesting method may be converted to cutting shapes which may be sent to the cutter plotter. The conversion to cutting shapes may be a computerized method that may be loaded in a memory of a computer, connected to the cutting plotter, and driven on the computer. The conversion to cutting shapes in a cutting plotter to command the cutting tools to manufacture the correct dimensioned decorative workpiece may be a computerized method.

Preferably the nesting method may provide a method to transfer cutting shapes to a cutting plotter in an appropriate format, for example DXF or PDF by appropriate means, for example network or USB-port.

A part in the cutting zone of a cutting plotter may fail to cut a nested decorative workpiece, such as malfunctions of a knife in a digital table cutter. Or a part in the cutting zone of a cutting plotter may fail to cut qualitative a nested decorative workpiece. Such parts in the cutting zone are called a failure zone in the cutting zone. The part in the cutting zone which is not a failure zone in the cutting zone is called a quality zone of the cutting zone. In a preferred embodiment with a nesting method, the nesting method may prevent that a nested decorative workpiece shall be cut in a failure zone of the cutting zone.

The detection of failure zones in the cutting zone may be done by visual monitoring and measuring the print quality while cutting the nested decorative patters on the cutting plotter and/or visual monitoring and measuring marks, printed by the cutting plotter, a nested decorative workpiece. Preferably the visual monitoring is done by inspection cameras.

Decorative Workpiece

The decorative workpieces are preferably rigid or flexible panels, but may also be rolls of a flexible substrate. In a preferred embodiment the decorative workpieces are selected from the group consisting of kitchen panels, flooring panels, furniture panels, ceiling panels and wall panels.

A preferred decorative workpiece may contain an inkjet printed thermosetting resin impregnated paper having an ink acceptance layer including an inorganic pigment P and a polymeric binder B wherein the P/B ratio is larger than 1.5 and a colour pattern including a colour pigment C with a P/C ratio larger than 4.0 heat pressed with a core layer and a protective layer, wherein the decorative workpiece is selected from the group consisting of flooring, kitchen, furniture and wall panels.

In a more preferred embodiment, the decorative workpiece includes a tongue and a groove capable of achieving glue less mechanical join.

The decorative workpieces, especially decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative workpieces as exemplified by EP1567334 (FLOORING IND).

In a preferred embodiment, the decorative panels are made in the form of rectangular oblong strips. The dimensions thereof may vary greatly. Preferably the panels have a length exceeding 1 meter, and a width exceeding 0.1 meter, for example the panels can be about 1.3 meter long and about 0.15 meter wide. According to a special preferred embodiment the length of the panels exceeds 2 meter, with the width being preferably about 0.2 meter or more. The decorative pattern of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, for example as described in U.S. Pat. No. 4,952,277 (BET PAPERCHEM).

In another preferred embodiment, the core layer is a board material composed substantially of wood fibres which are bonded by means of a poly-condensation glue, wherein the poly-condensation glue forms 5 to 20 percent by weight of the board material and the wood fibres are obtained for at least 40 percent by weight from recycled wood. Suitable examples are disclosed by EP2374588 (UNILIN).

Instead of a wood based core layer, also a synthetic core layer may be used, such as those disclosed by US2013062006 (FLOORING IND). In a preferred embodiment, the core layer comprises a foamed synthetic material, such as foamed polyethylene or foamed polyvinyl chloride.

Other preferred core layers and their manufacturing are disclosed by US2011311806 (UNILIN) and U.S. Pat. No. 6,773,799 (DECORATIVE SURFACES).

The thickness of the core layer is preferably between 2 and 12 mm, more preferably between 5 and 10 mm.

Tongue-and-Groove Profile

After cutting a nested decorative workpieces in a set of separate decorative workpieces, the side edge of a decorative workpiece of the set of separate decorative workpiece may be milled to produce a tongue or a groove profile, to make it possible to interconnect decorative workpieces, also click decorative workpieces, such as click laminates. The advantage thereof is an easy assembly requiring no glue. The shape of the tongue and groove profile (FIG. 11) necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

Other Preferred Embodiments

Another preferred embodiment is a deco store front comprised in the manufacturing of decorative workpieces.

Or another preferred embodiment is a deco digital workflow comprised in the manufacturing of decorative workpieces. The deco digital workflow is a system to manage the printing of decorative patterns by one or more digital print devices in a method of manufacturing deco workpieces, the preferred embodiment may comprise deco digital workflow system, for example for determining decorative patterns, nesting decorative patterns, digital printing nested decorative patterns on a decoration layer and/or digital cutting nested decorative workpiece with printed nested decorative patterns to separated decorative workpieces. To handle the mixture of decorative patterns, nested decorative patterns a deco digital workflow system is important and advantageous, for example to know from each nested decorative workpiece the correct nested decorative patterns. This may be monitored by reading marks on the nested decorative workpiece wherein the readings are feed back to the deco digital workflow system.

The deco digital workflow system comprises preferably a management information system (MIS) to provide information that the manufacturing of decorative workpieces require to manage themselves efficiently and effectively and to analyze and to facilitate strategic and operational activities.

In a preferred embodiment a part of a decorative pattern is digital printed on a package wherein a decorative workpiece, whether or not with other decorative workpieces, is wrapped in the package and wherein the decorative workpiece carries the decorative pattern. Prior the wrapping of the decorative workpieces the decorative workpieces may be collected. The collected decorative workpieces are preferably cut out of a nested decorative workpiece. The digital printing of the package is preferably managed by a deco digital workflow system.

The deco digital workflow system may manage the forming of relief on a decorative workpiece or a nested decorative workpiece by digital relief apparatus.

A deco storefront may be comprised in the deco digital workflow system. A deco storefront is a cloud-based web-to-print solution to enable decorative workpiece service providers or decorative workpiece buyers to create and manage online stores for manufacturing of decorative workpieces which is called a deco storefront.

Preferably a deco storefront is marketed as a hosted cloud service so there is no high initial investment needed in servers, software, databases or expensive symmetrical internet connections. This reduces the cost of deploying stores and improves their time-to-market.

The deco storefront may have an easy manageable store centre which is the central hub from which stores are set up and orders are tracked. Its dashboard preferably provides instant feedback about incoming orders and the status of orders that are in progress.

The deco storefront preferably comprises an online editor wherein decorative workpiece service providers or editors may design or edit decorative patterns or add decorative images. This gives the ability to the decorative workpiece service providers an innovative way of creating personalized decorative workpieces.

The integration of the deco storefront in a deco digital workflow system may increase the efficiency by saving time in for example the automatically downloading and processing orders of decorative workpieces.

Another preferred embodiment is a method wherein a part of a decorative pattern is digital printed on a package wherein a decorative workpiece, whether or not with other decorative workpieces, is wrapped in the package and wherein the decorative workpiece carries the decorative pattern. Prior the wrapping of the decorative workpieces the decorative workpieces may be collected. The collected decorative workpieces are preferably cut out of a nested decorative workpiece. The digital printing of the package is preferably managed by a deco digital workflow system.

REFERENCE SIGNS LIST

| Table of Reference Signs | | | |
| --- | --- | --- | --- |
| 100 | Nesting method | 302 | Flexible sheet |
| 201 | Decorative pattern | 303 | Flexible sheet |
| 202 | Decorative pattern | 150 | Nesting queue |
| 203 | Decorative pattern | 801 | Bleed area |
| 204 | Decorative pattern | 1 | Decoration layer |
| 205 | Decorative pattern | 7 | Decorative panel |
| 206 | Decorative pattern | 27-28 | Long side |
| 207 | Decorative pattern | 29-30 | Short side |
| 208 | Decorative pattern | R1 | Direction |
| 209 | Decorative pattern | R2 | Direction |
| 800 | Decorative pattern | 32 | Tongue |
| 301 | Flexible web | 33 | Groove |
| 5 | Decorative pattern | 24 | Locking means |
| 11 | Paper manufacturer | 19 | Cutting to size |
| 12 | Paper roll | 20 | Floor laminate manufacturer |
| 13 | Decor printer | 21 | Floor laminate |
| 14 | Gravure printing | 4 | Cross section |
| 15 | Inkjet printing | 31 | Coupling means |
| 16 | Decor paper roll | 9 | Top layer |
| 17 | Warehouse | 25 | Protective layer |

-continued

Table of Reference Signs

| 18 | Impregnation | 810 | Groove distance |
|---|---|---|---|
| 805 | Bleed distance | 807 | Bleed distance |
| 811 | Tongue distance | | |

The invention claimed is:

1. A method of manufacturing decorative workpieces, the method comprising the steps of:
    performing an image analysis on a content of a decorative image representing a wood pattern;
    selecting a region-of-interest in the decorative image, as a decorative pattern in a set of decorative patterns, based on the image analysis;
    rectangular nesting or true shape nesting the set of decorative patterns into a set of nested decorative patterns; and
    digitally printing the set of nested decorative patterns on a decoration layer; wherein
    the image analysis is selected from counting an amount of knots or cracks, measuring a size of knots or cracks, measuring a distance of a knot or a crack and an edge of a region-of-interest in the decorative image, measuring a density of wood grain lines, and detecting wood grain imperfections.

2. The method of manufacturing decorative workpieces according to claim 1, wherein a relief of the set of decorative patterns correctly matches the set of nested decorative patterns.

3. The method of manufacturing decorative workpieces according to claim 1, wherein the step of nesting the set of decorative patterns into the set of nested decorative patterns includes performing a nesting-on-the-fly method, and the set of nested decorative patterns are digitally printed by a single pass inkjet printer.

4. The method of manufacturing decorative workpieces according to claim 1, further comprising the step of:
    adding a connect area to the decorative pattern in the set of decorative patterns.

5. The method of manufacturing decorative workpieces according to claim 4, wherein the connect area is provided for a tongue-and-groove profile on a decorative workpiece.

6. The method of manufacturing decorative workpieces according to claim 5, further comprising the step of:
    digitally printing a mark in the connect area; wherein
    the mark is selected from cut marks, saw marks, alignment marks, control marks, information codes of the decorative pattern, information codes of print parameters of the decorative pattern, information text of a first decorative pattern, and information text of print parameters of the decorative pattern.

7. The method of manufacturing decorative workpieces according to claim 1, further comprising the step of:
    adding a bleed area to the decorative pattern.

8. The method of manufacturing decorative workpieces according to claim 7, wherein the bleed area is filled by cloning pixels of the decorative pattern.

9. The method of manufacturing decorative workpieces according to claim 8, wherein the cloning of pixels is mirror-wise cloning of pixels.

10. The method of manufacturing decorative workpieces according to claim 1, wherein the step of nesting is contained in a deco digital workflow system.

11. The method of manufacturing decorative workpieces according to claim 10, wherein the deco digital workflow system includes a deco storefront.

12. The method of manufacturing decorative workpieces according to claim 11, wherein the deco storefront includes an online editor for designing or editing decorative patterns and decorative images.

13. The method of manufacturing decorative workpieces according to claim 10, wherein the deco digital workflow system includes a management information system.

14. The method of manufacturing decorative workpieces according to claim 1, further comprising the steps of:
    a resin impregnation step of providing the decoration layer with melamine formaldehyde based resin; and
    heat pressing the decoration layer with a core layer and a protective layer to a nested decorative workpiece.

15. The method of manufacturing decorative workpieces according to claim 14, further comprising the step of:
    providing in accordance with the printed nested decorative patterns a relief on a nested decorative workpiece.

16. The method of manufacturing decorative workpieces according to claim 15, further comprising the step of:
    cutting the nested decorative workpieces into a set of separate decorative workpieces.

17. The method of manufacturing decorative workpieces according to claim 16, further comprising the step of:
    digital printing a portion of the decorative pattern on a package wherein a cut decorative workpiece including the decorative pattern, whether or not with other decorative workpieces, is wrapped in the package.

18. The method of manufacturing decorative workpieces according to claim 15, wherein the relief is provided by jetting inkjet droplets on top of cured or pin-cured inkjet droplets to create variances of height in the relief.

19. The method of manufacturing decorative workpieces according to claim 15, wherein the relief is provided by pressing a digital embossing plate, and elevations of the digital embossing plate are cured inkjet droplets.

* * * * *